July 24, 1928.

R. L. WILLIAMS 1,677,943

METHOD AND APPARATUS FOR MEASURING DISTANCE

Filed Jan. 17, 1924 2 Sheets-Sheet 1

Robert L. Williams
INVENTOR.

BY

Ezekiel Wolf
ATTORNEY.

July 24, 1928.    1,677,943
R. L. WILLIAMS
METHOD AND APPARATUS FOR MEASURING DISTANCE
Filed Jan. 17, 1924    2 Sheets-Sheet 2
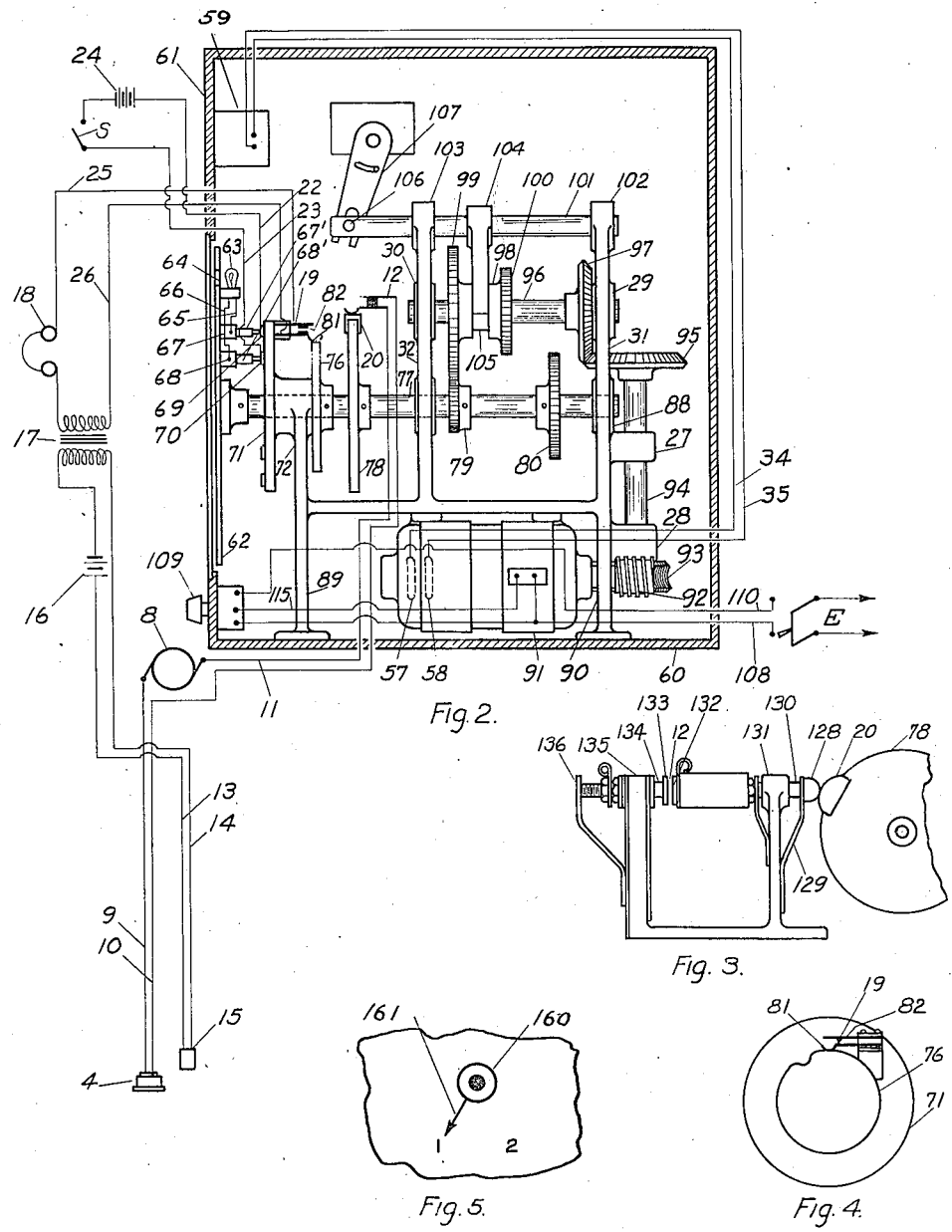
Robert L. Williams.
INVENTOR:
BY
Ezekiel Wolf
ATTORNEY.

Patented July 24, 1928.

1,677,943

UNITED STATES PATENT OFFICE.

ROBERT LONGFELLOW WILLIAMS, OF NEWTON, MASSACHUSETTS, ASSIGNOR TO SUBMARINE SIGNAL CORPORATION, OF BOSTON, MASSACHUSETTS, A CORPORATION OF DELAWARE.

METHOD AND APPARATUS FOR MEASURING DISTANCE.

Application filed January 17, 1924. Serial No. 686,922.

My invention in general is directed to the measurement of distance, and more particularly to the measurement of distance in the aid of navigation, such as distance, coasts, depths of water beneath a ship, icebergs, and other obstacles dangerous to the navigation of ships.

In the present method of distance measurement, I have discovered that an observer easily associates with a continuously constant rotating indicator an audible note which appears to be given when the indicator is in approximately the same position in successive revolutions. This finds a very useful application in the method of distance finding where at a certain point in the revolution of an indicator, for instance, the zero point a note is given by the sound sender and is heard later, when reflected from some reflecting surface, back through the same medium to a microphone receiver which transmits the signal through a telephone receiver to the ear of the observer. If the note of the sound sender is emitted at fairly short intervals then the signal as observed in the ears of the listener will follow in a consecutive rhythm such that the time of the signal can easily be identified with the position of a uniformly rotating indicator.

This application is particularly useful in depth sounding where at equal time intervals a note is emitted, the echo of which an observer at a later time hears through a telephone receiver.

In this method of measuring the depth of water beneath ships, commonly known as soundings, difficulty has been experienced not only in creating a short impulse such that the effect of the impulse is entirely over before the echo of the reflected wave returns but also in the method of controlling the receiving or detecting mechanism such that it is ready and capable of responding to the returning echo reflected from the bottom even though, on account of the great velocity of compressional waves in water, the echo follows very closely after the sound has been emitted. The common phenimenon of sound transmission in water, known to the experimenter as "trailing" is one of the difficulties which practically all the methods of soundings by echo has to overcome. In the ordinary meaning "trailing" is the gradual dying down of the sound source which lingers after the impulse of the first energy has been imparted to the water. In the present method this is overcome by creating a very short impulse in a highly damped transmitter, or by methods of sound screening and by a further provision which may cause the indicating mechanism to be inoperative during the time the sound is created.

The purpose of this invention is to obtain a simple method and means of distance measurement especially depth sounding by associating a rotating indicator with a periodically emitted signal.

This invention has for its aim also the construction of an apparatus to obtain a constant rotating light indicator, indicating the measurement in the desired units, and also production of a signal when the indicator is in a definite position.

The further purpose of this invention will be evident from the description of the method employed to obtain the desired results, and the description of apparatus used, an embodiment of which is described below and shown in the accompanying drawing in which:

Figure 2 represents a detail view of the indicating apparatus with the side of the housing removed.

Figure 3 is a detail of the contact closer for the sender.

Figure 4 is a contact cam for the telephone circuit.

Figure 5 is an indicator designating the scale.

Figure 1:
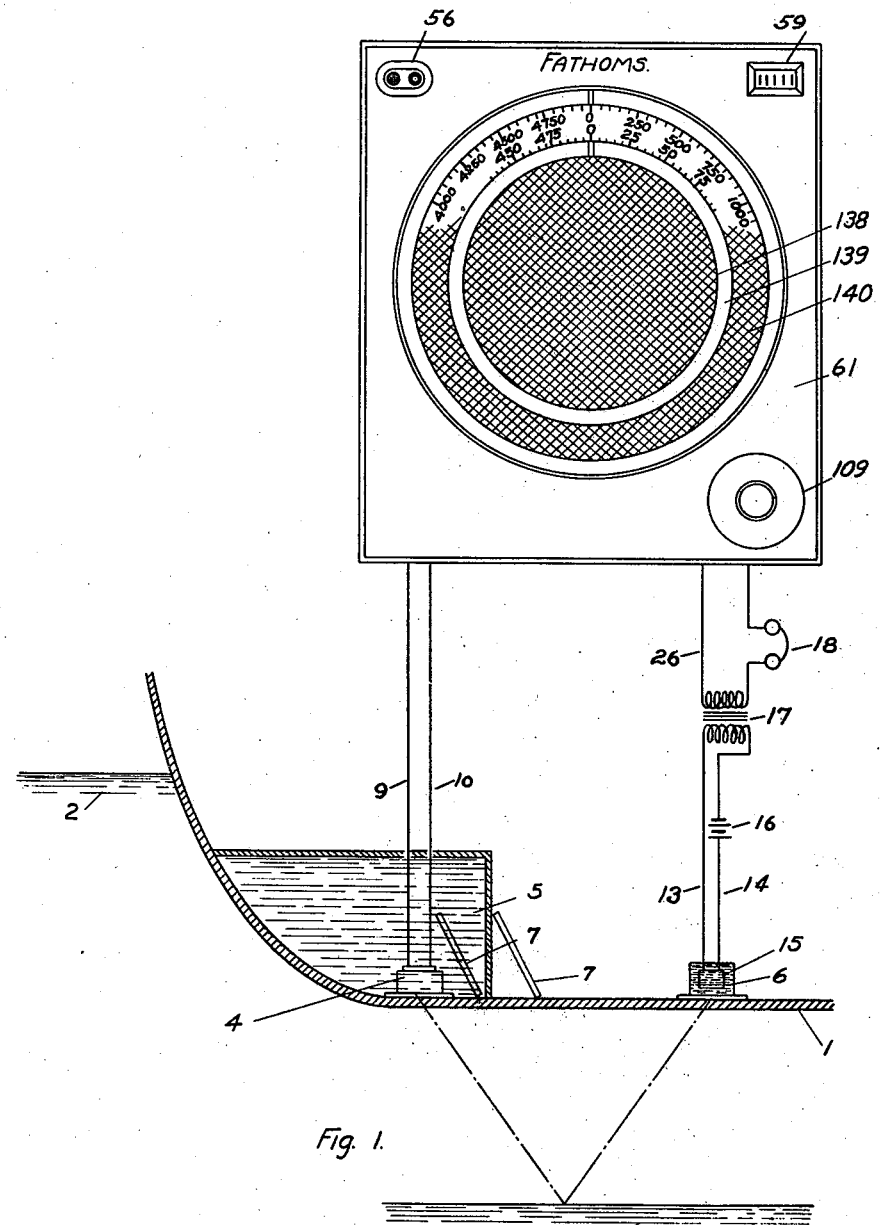
Figure 1 shows a front view of the indicating apparatus, the sender and receiver.

In Figure 1 is shown a section of a vessel at 1 emersed in the sound transmitting medium 2, and a bottom or reflecting surface 3. Within the vessel 1, is a sound source 4, such as an oscillator commonly used in submarine signaling work or any form of sound emitter which is shown as situated in a water tank 5, so that the loss of energy transmission to the outside water will be as slight as possible. Any other form of mounting or installation of the sound transmitter may be used, such as an installation of a sound source fixed rigidly upon the outside of a vessel as, for instance, a structure fixed rigidly to the keel of the vessel, or an overboard structure suspended from a davit upon the boat.

As shown in Figure 1, the sounder is in the forepeak tank while the sound receiving source, such as microphone 15 or the like, is shown in another tank 6, shielded somewhat from the direct sound of the source 4 by the boat and suitable screens 7, 7.

The relative positions in which the sound source and receiver are located may be acoustically screened from one another by the ship itself by placing the receiver and sender on opposite sides of the vessel, or by a variety of ways, or may even operate without screening in some cases.

The sender and receiver should be as near as possible in all cases, the only limit being the effect of the direct sound upon the receiver when through the nearness of the sender the intensity of the direct sound at the receiver is very great. As the receiver and sender are separated, the direct path and the reflected paths become more nearly equal so that a conceivable case can be imagined where the direct sound will not have sufficiently died down in intensity at the receiver before the reflected sound arrives at the receiver. This can only be overcome in such a case as just mentioned by having such a short note that the complete duration of the note including its objectionable effect at the end of the note is shorter than the time interval between the time the sound takes to travel the indirect and direct paths. Thus there is a position of the receiver and sender taking all these effects into consideration which gives the best results.

A further criterion in the selection of positions for the receiver and sender is the angle between the skin of the boat and the sound wave at the respective units. Ordinarily for the best reception the incoming wave should have a wave front parallel to the ship's skin at the receivers. These features have been incorporated in the embodiment shown in Figure 1.

The sender is energized by an electric source such as generator 8 through leads 9, 10, and 11, which with the contact maker and breaker 12 to be described later form an electrically conducting circuit when the latter is in a closed position.

The receiving source 15 is connected through leads 13 and 14 in a series circuit represented by the battery 16 and the transformer 17 suitably wound to operate the head telephones 18 in the secondary of the transformer. The secondary circuit, containing the head telephones 18, has, as an element, the contact 19 in series, for the purpose of breaking the head telephone circuit during a slightly longer time than the dog 20 closes the circuit to the sounding source.

The purpose of the contact 19, breaking the telephone circuit at the time when the sounding source is in operation, is to prevent confusion in the ears of the observer between the direct sound and the echo. This would ordinarily result since the direct sound and echo, at times, are similar and follow one another very closely.

It must be understood, of course, that the circuit to the receiving or listening source must be made inoperative at the times when the direct sound from the sender would ordinarily be heard at the receiver. This differs from the exact time when the sender is in operation by the time interval necessary for the direct sound to travel from the sender to the receiver. Ordinarily this time interval may be neglected since the receiving circuit is out over a time long enough to account for the trailing of the sender as mentioned above and since the sender and receiver are always as close together as the above mentioned conditions allow.

The mechanism for operating the rotating indicator and the contacts is shown, for the most part, in Figure 2. The mechanism is mounted in a housing 60, having a front panel 61 as shown in Figure 1.

Behind the front panel is a disc 62, which is preferably colored black. This disc carries near its periphery a small bright filament light 63 on the inner side with reference to the panel. In front of the light 63 there is a slit in the disc at 64 through which the light 63 can pass. Two wires from the light socket shown as 65 and 66 pass down to their respective brush holder 67 and 68 which are insulated from each other. The brushes 67' and 68' associated with the leads 65 and 66 respectively bear upon the rings 69 and 70 respectively mounted and insulated from each other upon the disc 71 which is fixed firmly upon the base or bearing 72 so that it is stationary at all times. Leads 22 and 23 connecting respectively to the rings 69 and 70 complete the light circuit to the battery 24 through the switch S. The light 63 furnishes a bright and exceedingly sharp indicator which, when the machine is in operation, is constantly illuminated. On the other side of the disc 71 opposite to that of the rings just mentioned is the contact 19 mentioned above. The function of this contact is to break the circuit containing the head telephones when the signal source is being operated. This is accomplished by means of the cam 76 mounted rigidly upon the rotating shaft 77 which carries, as well as the cam 76, the disc 62, the cam 78, the gears 79 and 80. The contact 19 is shut at all times except when the spring 81 recedes from the upper half 82 of the contact 19 as the surface of the cam drops away during a portion of its revolution as is plainly evident from Figure 4 which shows the actual construction of this cam and contacts. At that point the dog 20 of the cam 78 closes the contact maker and breaker 12 energizing the sound source. The upper contact 82 connects by means of the lead 25, and the lower contact 81 by means of the lead 26 through the secondary of the transformer 17 to the opposite ends of the head telephones 18 thus completing the head telephone circuit at times when the contact 19 is closed.

The shaft 77 is supported by two bearings 72 and 88 which are supported from the base of the casing 60 by supports 89 and 90. The shaft 77 carrying the members mentioned above is driven by the motor 91 through the gear drive about to be explained. Integral with the motor shaft is a worm gear 92 meshing with the gear 93 rotating the shaft 94 supported by supports 27 and 28. The gear 95 at the upper end of the shaft 94 drives the shaft 96 through the gear 97 which is rigidly connected thereto. The bearings for the shaft 96 is shown at 29 and 30 supported by the supports 31 and 32. The shaft 96 carries a sleeve 98 which has two different diameter gears at each end, a large gear 99 and a small gear 100. This sleeve 98 revolves with the shaft 96 but may be moved along the shaft in a slot, not shown, so that 99 may mesh with gear 79 or 100 may mesh with 80, depending whether the sleeve 98 is at the left or right in Figure 2. The mechanism for shifting the sleeve 98 which changes the speed of the revolving indicator is as follows: A shaft 101 movable longitudinally in the bearings 102 and 103, carries rigidly a forked piece 104 which fits into a groove 105 in the sleeve 98 but in no way attached thereto. The shaft 101 is slotted at one end and carries a pin 106 perpendicularly through the slot. The forked piece 107, the forked end of which fits about the pin 106, serves as a free joint whereby, when the piece 107 is rotated by turning a knob on the outside of the housing, as shown in Figure 5, from one side to the other, the shaft 101 is moved in its longitudinal direction and the sleeve 98 is thereby shifted to change the speed of the disc.

When the piece 107 is in its vertical position the sleeve 98 meshes with neither 79 nor 80.

The motor 91 is supplied through a current supply E in this case of 110 volts. One line 108 of the supply goes directly to the motor and connects also to the potentiometer 109, while the other line 110 of the supply goes to the end of the potentiometer 109 opposite to that where line 108 is connected. The movable connection of the potentiometer 109 leads to the wire 115 which is connected to the motor armature terminals. Thus, by rotation of the potentiometer arm and change of the place of connection for the wire 115, the voltage across the motor may be changed and the speed regulated. Besides this voltage regulation of the motor, there may also be a rheostat regulation upon the motor field whereby very fine adjustments of the speed of the motor may be obtained.

The mechanism for closing the energy source to the signal is effected through the cam 78 and the dog 20, as shown in detail in Figure 3. The cam in its revolution strikes the knob 128 mounted upon a spring 129, and carrying a plunger 130 acting longitudinally through the bearing 131, moves the contact face 132 into electrical connection with the face 133 which is supported by the plunger 134 moving in a similar bearing 135 and backed by a similar spring 136 as in the opposite end of the contact mechanism.

The face of the front of the housing is the panel 61 having mounted thereon a push button 56 on the upper left hand corner to throw the power supply E upon the apparatus. In the right hand corner is a frequency meter 59 which is connected across the armature of the motor 91 by slip rings 57 and 58 through wires 34 and 35 so that the frequency of the reversals of current in the motor and thereby its speed may be known.

The center of the panel contains a circular glass plate having an opaque center 138, ground or made opaque in some other way, a clear concentric ring 139 the same radial width as the slit 64 in the disc 62, and a second opaque ring 140 extending about the entire ring upon which is painted or marked in some way a suitable scale for measuring the desired time interval in the desired units. There may be two scales upon this ring or more, according to the interval to be measured and according to the speed of rotation of the disc 62. In the present application there is provision made for two scales and operation for the same. The inner scale goes from 0 to 500 fathoms, and the outer from 0 to 5000 fathoms. The lower range scale demands that the light rotate at a fairly rapid rate as will be explained later while the higher range scale as shown revolves at one tenth the speed of the latter. The speed at which the indicator turns for the lower range, however, is within that speed which allows the eye to perceive the indicator without the blurred effect common to a rapidly moving object.

In the left hand corner of the panel is the potentiometer 109, which has been described above.

The operation of the apparatus readily follows from the description given above. The push button on the panel closes the circuit to the power source E. The potentiometer 109 is turned until the motor 91 has the desired speed as noted by the frequency meter. It is to be understood, of course, that the motor 91, after adjusted properly, runs at a uniform and constant speed, causing the disc 62 to rotate at a definite and constant velocity, faster or slower according to the position of the sleeve 98 and thus carrying the light 63 and slit 64 about the ring 139 at a constant velocity.

In depth sounding, as an example of the use of the apparatus described above, the generator 8 is operated by a proper source, not shown, which impresses energy across the terminals of the electrical sound source 4, as the dog 20, upon the disc 78, closes the contact 12. The impulse created, travels to the reflecting bottom, returns, and is received by the receiver 15. The impulse is transmitted through the head telephones to the ears of the observer, who notes the position of the rotating indicator at the time of the signal. This position is a measure of the depth of the water beneath the ship.

Since the shaft 77 revolves continuously at constant speed, once in each revolution of the shaft a signal will be given when the contact 12 is closed by the action of the dog 20. This periodic signal will be heard by the listener, when its echo returns, who will thereby after a successive number of returns form a definite position at which the return occurs by the aid of the revolving indicator.

To determine which of the two scales to use in reading the depths, the operator may note the indicator as shown in Figure 5. The knob 160 has rigidly attached thereto the arrow 161 and is turned to shift the speed of the disc from the lower to the faster speed or vice versa. At the lower speed the arrow points to "1" while at the upper speed it points to "2".

As will be noticed from the scales, the lower range is marked 500 fathoms. Since the speed of sound in water is approximately 4800 ft./sec. the indicator must revolve at a speed of 48 revolutions per minute for this scale and 4.8 revolutions per minute for the outer scale. It is evident then that the ordinary eye can follow the indicator at this speed and locate the position at which the echo returns.

It will be noticed by the use of two speeds as described above, in the very deep water, soundings are not made as frequently as in the shallower water. In the present case there are ten soundings made in shallow water to one in deep water. For use in deep water since the cams go at a slow rate the length of the note of the sound sender will be much longer for the deeper water soundings than for shallow water soundings. These features are especially advantageous since the signal has more energy and is better able to excite the receiver upon its return than if a short note had been used in the one case, while in the other case it is highly desirable to have very frequent soundings in shallow water.

In addition it is to be noted that the direct signal is cut out at all times to allow the listener to obtain the rhythm of the single incoming echo signal undisturbed, to enable him to locate the position of the moving indicator.

As a ship is under way it very rarely happens that the slope of the bottom changes so rapidly that successive echoes will vary greatly relative to the position of the rotating indicator at the time of return of the signal. The observer will soon learn, moreover, to note successive changes in the return of the echo as indicative of change of depth, while at the same time judging the position of the indicator at the instant of the echo.

The depth sounding method as described above is exceedingly useful in the measurement of great depths where the signal on its return is apt to be weak. Here sensitive and simple receiving apparatus can be employed since its function is only to transmit the sound impulse to the head telephones, shifting to the observer the duty of noting the position of the rotating indicator.

Having now described my invention, I claim:

1. A method of distance and depth measurement with the aid of a sound producer, a sound receiver and a measuring device, including an indicator rotating at a constant speed with respect to a dial graduated in units of depth, which consists in emitting a succession of sound signals, each occurring when said rotating indicator is at a definite position with respect to said dial, in the direction of the object whose distance is to be measured, detecting the signals reflected from said object and transmitting the reflected signals to the ears of an observer to establish a succession of signals which may be associated with a second position on the dial to give a depth indication.

2. A method of distance and depth measurement with the aid of a sound producer, a sound receiver and a measuring device including an indicator rotating at a constant speed with respect to a dial graduated in units of depth which consists in emitting a sound signal when said rotating indicator is at a definite position with respect to said dial in the direction of the object whose distance is to be measured, detecting the signal reflected from said object and transmitting the reflected signal to the ears of an observer to establish a mental indication which may be associated with a position on the dial to give a depth indication.

3. A system for measuring distance and depths comprising a dial graduated in desired units of measurement, indicating means adapted to produce a continuous, unchangeable indication, means for rotating said indicating means at a constant and uniform rate about said dial, means for producing periodically a sound signal when said indicator passes the zero position on said dial, means for receiving the sound signal after reflection from the object whose distance is to be measured and means for transmitting the signal received to the observer's telephone, whereby the observer by repeated association of the signal received and the indicator will be able to locate the position of the indicator at the time of the reception of the signal.

4. A system for measuring distance and depths comprising a dial graduated in desired units of measurement, indicating means adapted to produce a continuous, luminous, unchangeable indication, means for rotating said indicating means at a constant and uniform rate about said dial, means for producing periodically a sound signal when said indicator passes the zero position on said dial, means for receiving the sound signal after reflection from the object whose distance is to be measured and means for transmitting the signal received to the observer's telephone, whereby the observer by repeated association of the signal received and the indicator will be able to locate the position of the indicator at the time of the reception of the signal.

5. A system for measuring distance and depths comprising a dial graduated in desired units of measurement, an apertured disc rotating coaxially with said dial, a lamp mounted upon said disc adjacent said aperture for producing a local illumination of the dial, means for illuminating said lamp continuously, means for rotating said disc at a constant and uniform rate about said dial, means for producing periodically a sound signal when said indicator passes the zero position on said dial, means for receiving the sound signal after reflection from the object whose distance is to be measured and means for transmitting the signal received to the observer's telephone, whereby the observer by repeated association of the signal received and the indication will be able to locate the position of the indicator at the time of the reception of the signal.

6. In a system for measuring distance and depths comprising a dial graduated in desired units of measurement, an apertured disc rotating coaxially with said dial, a lamp mounted upon said disc adjacent said aperture for producing a local illumination of the dial, and means for illuminating said lamp continuously comprising a stationary disc mounted coaxially with said rotating disc and provided with two conducting rings, a pair of brushes bearing against said rings and mounted upon said rotating disc, means for connecting said brushes electrically to said lamp and means for applying current to said rings.

7. A system for measuring distance and depths comprising a dial graduated in desired units of measurement, indicating means adapted to produce a continuous, unchangeable indication, means for rotating said indicating means at a constant and uniform rate about said dial, a cam rotating on the same shaft with said indicator, a pair of contacts operated by said cam when said indicator is substantially in its zero position, and means including said cam and contacts for producing a sound signal at the time of said zero position of said indicator, means for receiving the sound signal after reflection from the object whose distance is to be measured and means for transmitting the signal received to the observer's telephone, whereby the observer by repeated association of the signal received and the indicator will be able to locate the position of the indicator at the time of the reception of the signal.

In testimony whereof I affix my signature.

ROBERT LONGFELLOW WILLIAMS.